United States Patent
Kawai et al.

(10) Patent No.: US 7,764,466 B2
(45) Date of Patent: Jul. 27, 2010

(54) THIN-FILM MAGNETIC HEAD WITH CLOSURE AND MANUFACTURING METHOD OF THE HEAD

(75) Inventors: Mitsuyoshi Kawai, Tokyo (JP); Tomonaga Nishikawa, Tokyo (JP); Tsutomu Chikamatsu, Tokyo (JP); Makoto Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 789 days.

(21) Appl. No.: 11/553,706

(22) Filed: Oct. 27, 2006

(65) Prior Publication Data
US 2007/0109683 A1    May 17, 2007

(30) Foreign Application Priority Data
Nov. 17, 2005   (JP)   .............................. 2005-332650

(51) Int. Cl.
*G11B 5/31*   (2006.01)
(52) U.S. Cl. .............................. 360/125.72; 360/234.7; 360/237.1
(58) Field of Classification Search .............. 29/603.12; 360/237, 237.1, 234.6, 234.7, 125.3, 125.71, 360/125.72, 125.73, 128
See application file for complete search history.

(56) References Cited

U.S. PATENT DOCUMENTS

| 5,142,768 A | 9/1992 | Aboaf et al. |
| 5,490,027 A * | 2/1996 | Hamilton et al. ......... 360/246.1 |
| 5,499,153 A * | 3/1996 | Uemura et al. .......... 360/234.6 |
| 6,947,259 B2 | 9/2005 | Miyazaki et al. |

FOREIGN PATENT DOCUMENTS

| JP | 6-12622 | 1/1994 |
| JP | 6-309625 | 11/1994 |
| JP | 08-321012 | * 3/1996 |
| JP | 8-321012 | 12/1996 |

OTHER PUBLICATIONS

U.S. Appl. No. 11/497,376, filed Aug. 2, 2006, Kazuhiko Maejima, et al.

* cited by examiner

*Primary Examiner*—Craig A. Renner
*Assistant Examiner*—Tamara Ashford
(74) *Attorney, Agent, or Firm*—Oblon, Spivak, McClelland, Maier & Neustadt, L.L.P.

(57) ABSTRACT

A thin-film magnetic head where the closure is bonded with sufficiently high adhesive strength by the adhesive layer thinner than conventional and that is free from the problem of fine dusts, is provided. The head comprises: a substrate having an element-formed surface and an opposed-to-medium surface; at least one magnetic head element provided on/above the element-formed surface; an overcoat layer formed on the element-formed surface; an etching pattern formed on a part of an upper surface of the overcoat layer, the whole or a part of the etching pattern being filled up by adhesive; a closure provided on the etching pattern of the overcoat layer; and an opening portion formed close to an edge on the opposite side to the opposed-to-medium surface of an adhesive surface of the closure, being a portion exposed from the closure of the etching pattern.

12 Claims, 9 Drawing Sheets

TRAILING SIDE ←→ LEADING SIDE

TRACK WIDTH DIRECTION

Fig. 6b

TRACK WIDTH DIRECTION

THIN-FILM MAGNETIC HEAD WITH CLOSURE AND MANUFACTURING METHOD OF THE HEAD

PRIORITY CLAIM

This application claims priority from Japanese patent application No. 2005-332650, filed on Nov. 17, 2005, which is incorporated herein by reference.

BACKGROUND OF THE INVENTION

1. Field of the Invention

The present invention relates to a thin-film magnetic head that comprises a closure and makes contact with a magnetic recording medium during read and write operations, a head gimbal assembly (HGA) with the thin-film magnetic head and a magnetic recording apparatus with the HGA and the medium. Further, the present invention relates a manufacturing method of the thin-film magnetic head.

2. Description of the Related Art

A magnetic disk drive apparatus such as a hard disk drive (HDD) or a flexible disk drive (FDD) is a representative example of the magnetic recording apparatuses, which is portable and lower in price per byte than semiconductor memory. Recently, because the volume of various data becomes larger due to the spread use of the multimedia and the Internet, the magnetic disk drive apparatus is strongly required to have much larger capacity and to be further miniaturized.

In the situation, a contact-type apparatus is worth noting because of its possibility of higher recording density. The contact-type apparatus has, for example, a loading mechanism for transferring an inserted cartridge including a disk to the predetermined position, a rotary drive mechanism for holding and rotating the disk in the transferred cartridge, a magnetic head device for writing data signals to the rotated disk and reading data signals from it, and a moving mechanism for moving the magnetic head device in the radial direction on the disk.

The magnetic head in the magnetic head device writes and reads data signals in contact with the magnetic disk. A Metal-In-Gap (MIG) head has conventionally used as the contact-type head. However, in order to respond the increasing data storage capacity and the further miniaturization of the magnetic disk drive apparatus, a thin-film magnetic head for an HDD, which inherently meets higher recording density, is being applied to the contact-type apparatus. The thin-film magnetic head for the HDD has a structure suitable for flying on the magnetic disk without contact during read and write operations. Therefore, the simple use of the thin-film magnetic head under the contact condition may cause a significant wear or crash of the head. To avoid the problem, U.S. Pat. No. 6,947,259 proposes the limitation to a predetermined range of the distance between an electromagnetic transducer (magnetic head element) and the contact edge of an overcoat layer. Further, Japanese Patent Publication No. 06-309625A describes a contact-type head for perpendicular magnetic recording with the sliding surface of an antiwear layer.

Furthermore, U.S. Pat. No. 5,142,768 and Japanese Patent Publications Nos. 08-321012A and 06-012622A describe a magnetic head used for a magnetic tape drive etc., which has a bonded protection plate such as a closure block.

However, when the "closure-type" miniaturized magnetic head is used for a magnetic disk drive apparatus such as a FDD, a recess is likely to be generated in the end portion on the opposed-to-medium surface side of an adhesive layer that bonds the closure, which may cause a negative effect about sliding operation.

In the use of the "closure-type" magnetic head, the closure makes repeated contact with the magnetic disk rotating at high speed. In addition, the adhesive area cannot be avoided to become small due to the miniaturization of the head for higher recording density. For these reasons, the adhesive strength of the closure is required to be sufficiently high. As a method for enhancing the adhesive strength, Japanese Patent Publication No. 08-321012A describes a technique in which fine grooves are formed on the adhesive surface of the closure or the protective layer of the head elements to improve the adhesive strength.

When this technique is used, the thickness of the adhesive layer is usually required to be at least 0.4-0.5 micrometer ($\mu$m) to obtain the sufficiently high adhesive strength. However, the adhesive layer with such a large thickness is likely to cause a recess to be generated in the end portion on the opposed-to-medium surface side of the adhesive layer by the action of abrasives during finish polishing of the opposed-to-medium surface. As a result, the recess portion has some possibility to catch and hold fine dusts, which may cause a negative effect about sliding operation between the head and the medium.

Meanwhile, in the case that the adhesive layer has less thickness, it becomes difficult to obtain the sufficiently high adhesive strength, and further, variations in the thickness of the adhesive layer among manufactured heads, that is to say, variations in the adhesive strength become larger. As a result, the reliability of strength in the thin-film magnetic head is likely to deteriorate and the manufacturing yields may be reduced. Furthermore, when a large pressure is applied to the closure during adhesive process to make the adhesive layer thinner, some disadvantage, such as a contamination of electrode pads, is likely to occur due to the protrusion or running off of the adhesive.

BRIEF SUMMARY OF THE INVENTION

Therefore, it is an object of the present invention to provide a thin-film magnetic head in which the closure is bonded with sufficiently high adhesive strength by the adhesive layer thinner than conventional one and that is free from the problem of fine dusts, an HGA provided with this thin-film magnetic head and a magnetic recording apparatus provided with this HGA.

And it is another object of the present invention to provide a thin-film magnetic head that shows high reliability and improved manufacturing yields due to the suppression of thickness variations of the adhesive layer among manufactured heads by controlling the thickness of the adhesive layer to a predetermined small value, an HGA provided with this thin-film magnetic head and a magnetic recording apparatus provided with this HGA.

It is further another object of the present invention to provide a manufacturing method of the above-mentioned thin-film magnetic head.

Here, some terms will be defined before explaining the present invention. In a layered structure of the head elements formed on an element-formed surface of a substrate, a component that is closer to the substrate than a standard layer is defined to be "below" or "lower" in relation to the standard layer, and a component that is in the stacked direction side of the standard layer is defined to be "above" or "upper" in relation to the standard layer.

According to the present invention, a thin-film magnetic head is provided, which comprises: a substrate having an element-formed surface and an opposed-to-medium surface; at least one magnetic head element provided on/above the element-formed surface, for writing and/or reading data signals; an overcoat layer formed on the element-formed surface so as to cover the at least one magnetic head element; an etching pattern formed on a part of an upper surface of the overcoat layer, the whole or a part of the etching pattern being filled up by adhesive; a closure provided on the etching pattern of the overcoat layer; and an opening portion formed close to an edge on the opposite side to the opposed-to-medium surface of an adhesive surface of the closure, being a portion exposed from the closure of the etching pattern.

In this head, the etching pattern preferably includes a repeated lattice pattern with continuing etched area, and is preferably provided in such a way that the etching pattern does not reach an edge on the opposed-to-medium surface side of the upper surface of the overcoat layer. Further, it is also preferable that a thickness of an adhesive layer between a non-etched upper surface of the etching pattern and the adhesive surface of the closure is 0.1 µm (micrometer) or less.

In the just described head according to the present invention, a thickness required for bonding is substantially secured because the depth of the etching pattern is added to the thickness of the adhesive on the etched bottom of the etching portion, though the thickness of the adhesive layer for bonding the closure is less than the conventional one. Further, the etching pattern enlarges the contact area between the adhesive and the overcoat layer and increases anchor effect to maintain or improve the adhesive strength.

In the case of the adhesive layer with the smaller thickness, almost no recess, which is usually generated in the conventional case, is formed in the end portion on the opposed-to-medium surface side of the adhesive layer. As a result, the sliding operation between the head and the disk during read and write operations can be performed without the problem of fine dusts.

Further, it is preferable that a groove for preventing adhesive from outflowing is formed on the upper surface of the overcoat layer and in the back of the opening portion when viewing from the opposed-to-medium surface side, and at least one pad of signal electrode for the at least one magnetic head element is provided on the upper surface of the overcoat layer and in the back of the groove when viewing from the opening portion side.

Furthermore, it is also preferable that at least one element contact pad is provided, having a contact surface including a part of the opposed-to-medium surface of the substrate, a part of an end surface of the overcoat layer and a part of an end surface of the closure, and one end of the at least one magnetic head element reaches the contact surface.

According to the present invention, an HGA is further provided, which comprises: the above-described thin-film magnetic head; trace conductors for supplying currents to the at least one magnetic head element; and a support structure for supporting the thin-film magnetic head.

According to the present invention, a magnetic recording apparatus is further provided, which comprises: the above-described HGA; at least one magnetic recording medium; and a recording and/or reproducing circuit for controlling write and/or read operations of the at least one thin-film magnetic head in relation with the at least one magnetic recording medium.

According to the present invention, a manufacturing method of a thin-film magnetic head is further provided, which comprises steps of: forming at least one magnetic head element on an element-formed surface of a first substrate; forming an overcoat layer on the element-formed surface so as to cover the at least one magnetic head element; forming an etching pattern on a part of an upper surface of the overcoat layer; bonding a second substrate that has at least one long convex part being to become a closure to the overcoat layer in such a way that at least one upper surface of the at least one long convex part has surface contact with an upper surface of the etching pattern through adhesive and in such a way that a part of the etching pattern is exposed, thus forming an opening portion close to an edge on the opposite side to an opposed-to-medium surface of at least one adhesive surface of the at least one long convex part; and forming a closure by grinding the second substrate.

In this manufacturing method, it is preferable that the adhesive is applied to the at least one upper surface of the at least one long convex part in the step of bonding the second substrate. Further, in the step of forming the etching pattern, it is also preferable that a groove is formed on the upper surface of the overcoat layer and in the back of the opening portion when viewing from the opposed-to-medium surface side, so as to prevent the adhesive from outflowing in the step of bonding the second substrate.

By taking the just described measures against the outflow of the adhesive, a sufficient amount of pressure can be applied to improve the adhesive strength. This enables the thickness of the adhesive layer to be controlled to a smaller value than the conventional one and the variation in the thickness of the adhesive layer among manufactured heads to be suppressed. As a result, the reliability in the adhesive strength and manufacturing yields are improved.

In the just described manufacturing method, also preferably, the first substrate is a wafer substrate, and after the step of forming the etching pattern, the wafer substrate is cut into a plurality of substrate pieces having a chip row or a plurality of chip rows in which a chip includes the at least one magnetic head element, and then, after the step of bonding the second substrate to the substrate piece, the closure is formed by grinding the second substrate, and then, the substrate piece provided with the closure is cut into a plurality of row bars in each of which the chips are aligned, and then, after an MR height process is performed by polishing the row bar, the polished row bar is cut into individual thin-film magnetic heads.

In the case that the first substrate is the wafer substrate, it is more preferable that, after the step of forming the etching pattern, grooves are formed in positions including cutting plane lines used when cutting the wafer substrate or cutting the substrate piece, to prevent the adhesive from outflowing in the step of bonding the second substrate.

Further, it is also preferable that, in the step of forming the etching pattern, MR height process zones are formed which are non-etched portions in the etching portion and include lines being to become an edge on the opposed-to-medium surface side of the upper surface of the overcoat layer after the step of performing the MR height process, so that the etching pattern never reaches the head end surface on the side of the opposed-to-medium surface.

Further objects and advantages of the present invention will be apparent from the following description of preferred embodiments of the invention as illustrated in the accompanying drawings. Some elements have been designated with same reference numerals in the different drawings.

DETAILED DESCRIPTION OF THE INVENTION

Figure 1:
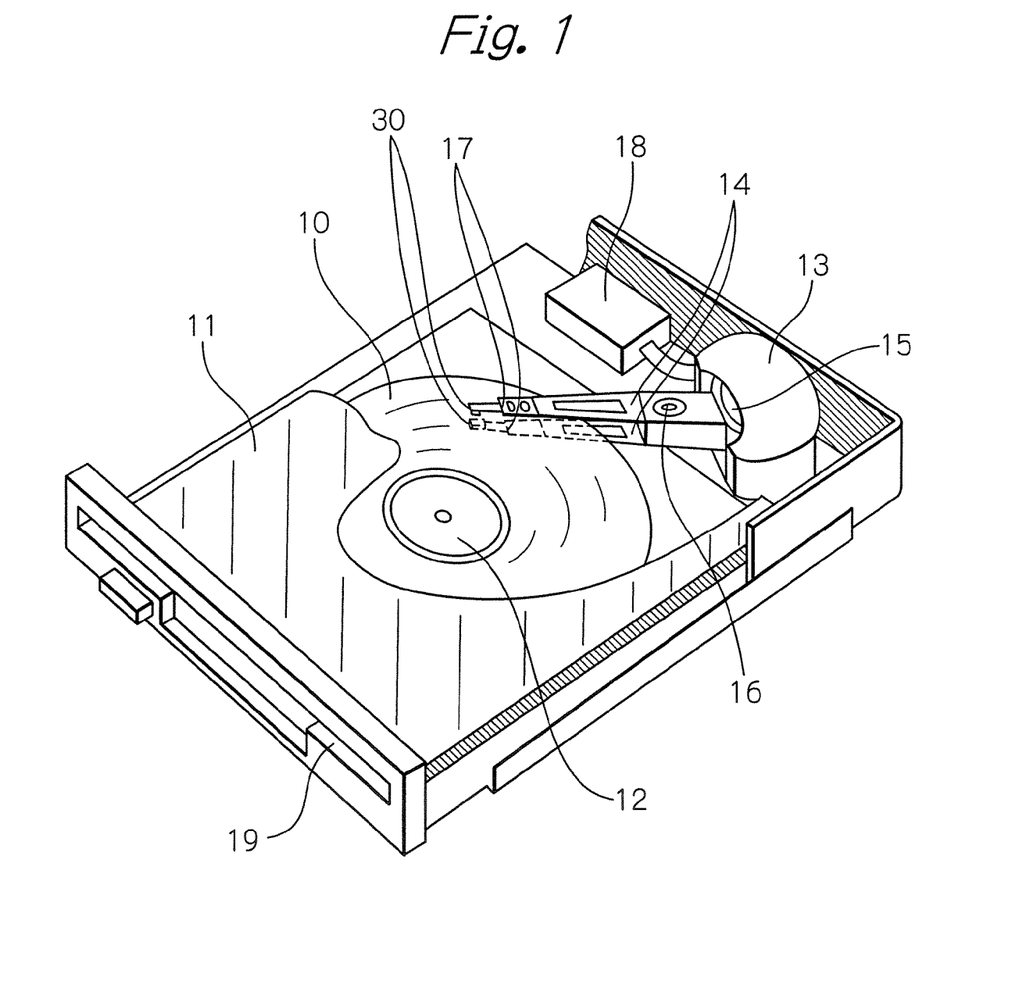
FIG. 1 shows a perspective view schematically illustrating a structure of a main part of an embodiment of a magnetic recording apparatus according to the present invention.

FIG. 1 shows a perspective view schematically illustrating a structure of a main part of an embodiment of a magnetic recording apparatus according to the present invention.

In FIG. 1, reference numeral 10 indicates a magnetic disk that is included in a disk cartridge 11 and has a centered hub 12 to be coupled with a spindle motor. The magnetic disk 10 may be flexible or rigid, and is formed by stacking magnetic recording layer(s) on one/both side(s) of a disk substrate made of a polymer film, a thin metal foil, a thick nonmagnetic metal such as Al or Al alloys, or a glass.

Also in the figure, Reference numeral 13 indicates an assembly carriage device for positioning two thin-film magnetic heads 30 on both tracks on front and rear sides of the disk respectively, 18 indicates a recording and reproducing circuit for controlling write and read operations of the thin-film magnetic heads 30, and 19 indicates a loading slot to which the disk cartridge 11 is inserted, respectively. The disk cartridge 11 has a window and a shutter, though not shown in the figure. When the disk cartridge 11 is loaded through the loading slot 19, the shutter is opened and the surface of the magnetic disk 10 is exposed, then the thin-film magnetic heads 30 writes to the disk 10 and reads from the disk 10.

The assembly carriage device 13 is provided with two drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A thin-film magnetic head 30 is mounted on each HGA 17 in such a way that the magnetic disk 10 is pinched by the two magnetic heads. A part of the sliding-side surface of each thin-film magnetic head 30 is in contact with the front/rear surface of the magnetic disk 10 during read and write operations. One of the thin-film magnetic heads 30 may be a dummy head for stabilizing the contact between the other head and the surface of the disk 10.

The recording and reproducing circuit 18 is provided with, though not shown in the figure, an LSI for controlling read and write operations, a write gate for receiving recording data from the LSI, a write circuit for outputting the write gate signals to a electromagnetic coil element to be described, a constant current circuit for providing sense currents to a magnetoresistive (MR) effect element to be described, an amplifier for amplifying output voltages generated from the MR effect element and a demodulating circuit for outputting reproduced data to the LSI.

In the above-described embodiment, the magnetic disk 10 is included in the disk cartridge 11, however, it is also preferable that the center of the magnetic disk is connected to the axis of the spindle motor, and the disk is full-time fixed in the apparatus. Further, in this disk-fixed case, a plurality of the magnetic disks can be stacked in the direction along the axis of the spindle motor accompanied by double or appropriate number of the HGAs and drive arms.

Figure 2:
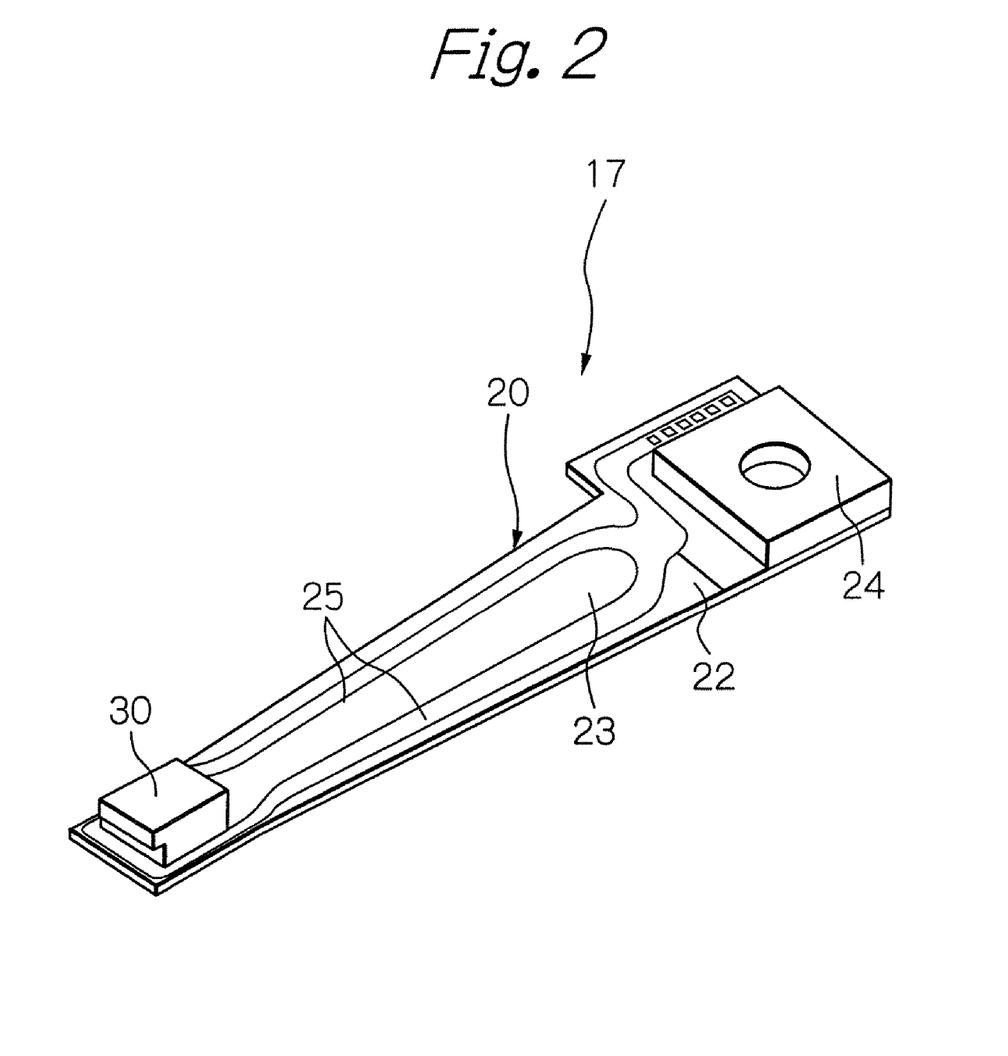
FIG. 2 shows a perspective view illustrating an embodiment of an HGA according to the present invention.

FIG. 2 shows a perspective view illustrating an embodiment of an HGA according to the present invention.

As shown in FIG. 2, the HGA 17 is constructed by fixing the thin-film magnetic head 30 on an end portion of a suspension 20 and by electrically connecting one end of a wiring member 25 to signal electrodes of the head 30.

The suspension 20 is mainly constructed of a load beam 22, a flexure 23 with elasticity fixed and supported on this load beam 22, a base plate 24 provided on the base portion of the load beam 22, and the wiring member 25 that is provided on the flexure 23 and is made up of trace conductors and connection pads electrically connected to both ends of the trace conductors. Though not shown in the figure, it is also possible to attach a head drive IC chip at some midpoint of the suspension 20.

Figure 3A:
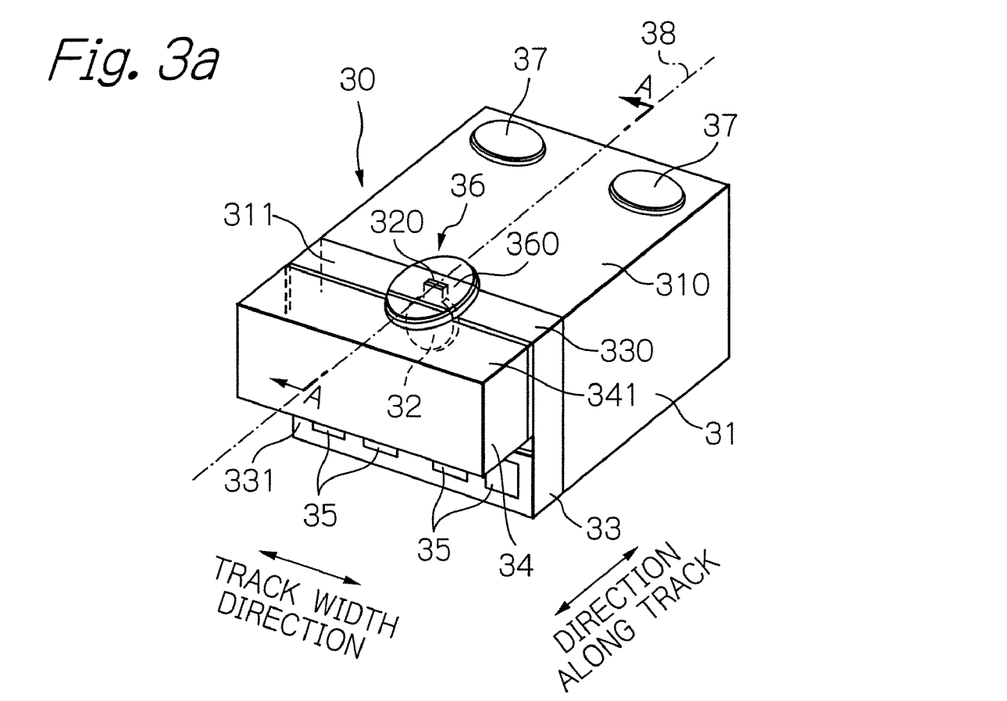
FIGS. 3a and 3b show perspective views schematically illustrating an embodiment of a thin-film magnetic head provided on the end portion of the HGA in FIG. 2.
Figure 3B:
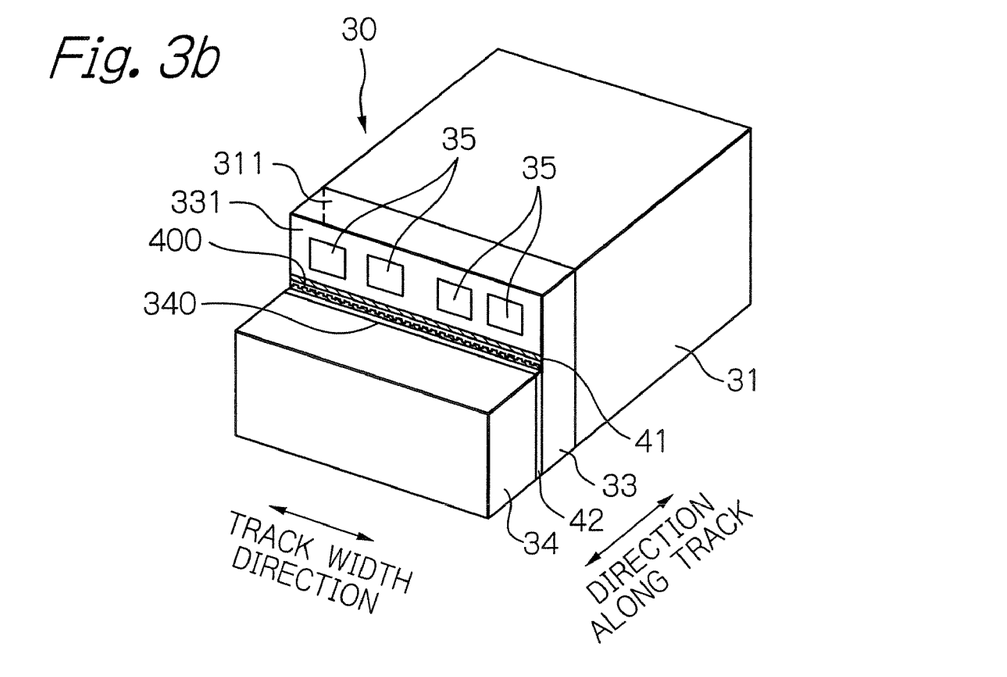

FIGS. 3a and 3b show perspective views schematically illustrating an embodiment of a thin-film magnetic head provided on the end portion of the HGA in FIG. 2. FIG. 3a is illustrated by viewing from the side of opposed-to-medium surface, and FIG. 3b is illustrated by viewing from the side of head end surface bonded directly by the suspension.

As shown in FIG. 3a, the thin-film magnetic head 30 is provided with a slider substrate 31 having a opposed-to-disk surface (opposed-to-medium surface) 310 and an element-formed surface 311 perpendicular to the surface 310, a magnetic head element 32 formed on/above the element-formed surface 311, an overcoat layer 33 formed on the element-formed surface 311 so as to cover the magnetic head element 32, a closure 34 bonded on a part of the upper surface 330 of the overcoat layer 33, an element contact pad 36 formed in the sliding-side surface including the surface 310 of the head 30 where one end 320 of the magnetic head element 32 reaches the contact surface 360 of the pad 36, two contact pads 37 formed in the opposed-to-disk surface 310, and four signal electrodes 35 used for the magnetic head element 32, formed on an exposed part of the upper surface 331 of the overcoat layer 33.

The element contact pad 36 has the contact surface 360 with an elliptical shape having a major axis along track, and is provided on the central axis 38 of the opposed-to-disk surface 310 expanding in the direction along track. That is to say, the element contact pad 36 is centrally positioned in track width direction. The contact surface 360 consists of a part of the opposed-to-disk surface 310 of the slider substrate 31, a part of the end surface 330 of the overcoat layer 33, and a part of the end surface 341 of the closure 34. One end 320 of the magnetic head element 32 reaches the above-described described part of the end surface 330 of the overcoat layer 33. In this embodiment, the contact surfaces of the contact pads 37 also have an elliptical shape.

By providing the above-described element contact pad 36, only the contact surface 360 can have contact with the surface of the magnetic disk in the peripheral area of the magnetic head element during read and write operations. As a result, the wear of the head is sufficiently suppressed and the high reliability over time of the head can be maintained. Further, peripheral corners of the element contact pad 36 and the contact pads 37 are chamfered to be made round. The chamfered corners are preventive against damage on the surface of the magnetic disk by contact.

During read and write operations, two thin-film magnetic heads 30 each of which has the element contact pad 36 pinch the magnetic disk 10 as shown in FIG. 1, and the respective element contact pads 36 are positioned so as to be just opposed to each other through the magnetic disk 10. As a result, the end of the magnetic head element 32 and the surface of the magnetic disk 10 have a secure contact with each other.

Alternatively, the element contact pad may be provided in a position that is out of the central axis 38 and is not overlapped with the central axis 38. When two thin-film magnetic heads 30 each of which has such a element contact pad pinch the magnetic disk, the respective element contact pads are positioned to be out of the respective central axes 38 in opposite direction to each other, and not to be opposed to each other. In the case, especially when the disk is flexible, the element contact pads support the magnetic disk 10 in such a way that a vertical section of the disk becomes a gradual S-curve shape. As a result, the end of the magnetic head element 32 and the surface of the magnetic disk 10 have a secure contact with each other.

As shown in FIG. 3b, the four signal electrodes 35 are formed on an exposed part of the upper surface 331 of the overcoat layer 33. In the conventional manufacturing process of a thin-film magnetic head with a closure on an overcoat layer, it is difficult to set up a surface for forming the signal electrodes. However, by forming the signal electrodes on the exposed part of the upper surface of the overcoat layer 33, the reliable signal electrodes can be provided without great burden in manufacturing process.

Further, an opening portion 400 and an outflow-preventing groove 41 is formed close to an edge 340 on the opposite side to the opposed-to-disk surface 310 of the adhesive surface of the closure 34.

The opening portion 400 is a portion exposed from the closure 34 of an etching pattern formed on the upper surface 331 of the overcoat layer 33. Reference numeral 42 is an adhesive layer, and some adhesive material of the adhesive layer 42 exists in the form of filling up the whole or a part of the opening portion 400 or running off the opening portion 400.

The adhesive layer 42 has a layer thickness of 0.1 μm (micrometer) or less, preferably from 0.05 to 0.1 μm, smaller than that of the conventional adhesive layer. The thickness of the conventional adhesive layer is approximately from 0.4 μm to 1.0 μm, and such a large amount of thickness causes abrasives to break into the adhesive layer during finish polishing of the opposed-to-disk surface. In fact, abrasives for usual finish polishing have a specification of 0.1 μm in diameter and are so small that they can break into the adhesive layer and grind it. In the conventional case, a recess is generated in the end portion on the opposed-to-disk surface side of the adhesive layer. As a result, during read and write operations, the recess portion has some possibility to catch and hold fine dusts, which may cause a negative effect about sliding operation between the head and the disk. On the contrary, the thickness of the adhesive layer 42 in the present invention is much smaller than that of the conventional adhesive layer, therefore, there is much less possibility that the abrasives may break into the adhesive layer 42 and grind it during finish polishing. As a result, the recess is hardly generated at all under the condition of the very thin adhesive layer. Consequently, the problem of fine dusts can be avoided in the present invention.

The outflow-preventing groove 41 is provided between the opening portion 400 and the signal electrodes 35, and is extended in the track-width direction. That is to say, the outflow-preventing groove 41 is formed in the back of the opening portion 400 when viewing from the opposed-to-disk surface side. The width of the outflow-preventing groove 41 is, for example, approximately 10 μm. The outflow-preventing groove 41 prevents the signal electrodes 35 from being polluted with the adhesive by pooling the adhesive that outflows from and runs off the opening portion 400 within itself.

As is obvious, the thin-film magnetic head according to the present invention is not limited to the above-described embodiment. For example, the contact surface of the element contact pad 36 as well as the contact pads 37 may have a shape of ellipsoid with the major axis along track width direction, circle or rectangle. Further, the element contact pad and the contact pads may be omitted if not required. Furthermore, the number of the signal electrodes 35 may be optional though depending on the structure and number of the magnetic head element 32 or the other elements, and the presence of grounding to the slider substrate 31. The shape of the opening portion 400 and the design of the etching pattern a part of which becomes the opening portion 400 will be described in detail below.

Figure 4A:
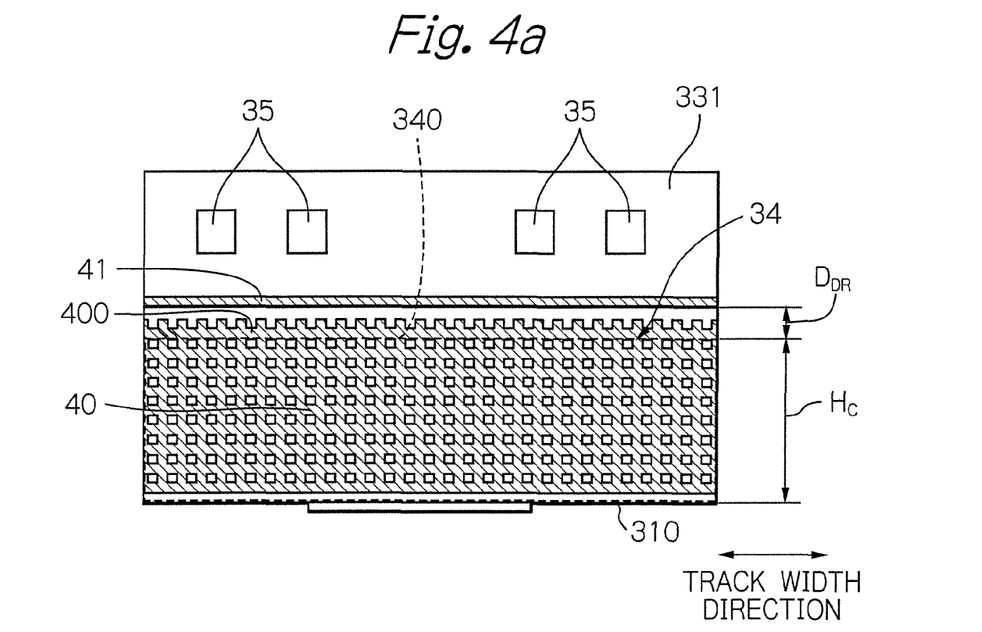
FIGS. 4a and 4b show top views illustrating a design of the etching pattern.
Figure 4B:
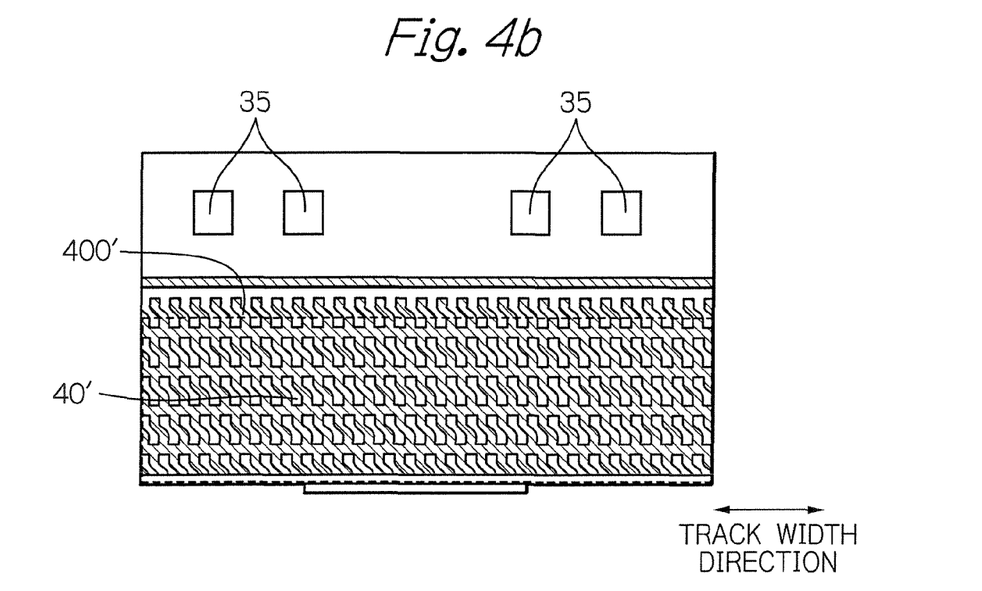

FIGS. 4a and 4b show top views illustrating a design of the etching pattern. In the figure, the closure 34 is not shown for viewability except for broken lines indicating its contour. That is to say, the area bounded by the broken lines corresponds to the adhesive surface.

As shown in FIG. 4a, an etching pattern 40 is formed on a part of the upper surface 331 of the overcoat layer, which includes a repeated lattice pattern with continuing etched area. In the figure, the etched area is shown as shaded area. The width of the etched area is, for example, approximately 10 μm, and the depth of the etched area from the upper surface 331 is, for example, approximately 3 μm. The size of non-etched rectangular area is, for example, approximately 100 μm$^2$ (10 by 10 micrometers).

Some adhesive material of the adhesive layer 42 (shown in FIG. 3b) fills up the whole or a part of the etching pattern 40. The closure 34 is bonded on the area bounded by the broken lines on the etching pattern 40. Here, the adhesive layer 42 has the above-mentioned smaller thickness of 0.1 μm or less. Nonetheless, the etching pattern 40 enlarges the contact area between the adhesive and the overcoat layer and increases anchor effect to maintain or improve the adhesive strength. Meanwhile, the height Hc of the bonded closure 34 is, for example, approximately 120 μm.

The opening portion 400 is a portion of the etching pattern 40 exposed from the edge 340 on the opposite side to the opposed-to-disk surface 310 of the adhesive surface in the closure 34. The opening portion 400 actually becomes exits of escape routes for the adhesive filling the etching pattern 40 and pressed during adhesion process of the closure 34. Providing this opening portion 400 effects a small and uniform thickness between the non-etched surface of the etching pattern 40 and the adhesive surface of the closure 34, thus, the variations in the thickness of the adhesive layer 42 among manufactured heads can be suppressed. The outflow-preventing groove 41 prevents the signal electrodes 35 from being polluted with the adhesive by pooling the adhesive that outflows from and runs off the opening portion 400 within itself. Here, the distance DDR between the outflow-preventing groove 41 and the edge 340 is, for example, approximately 40 µm.

The etching pattern 40 does not reach the edge on the opposed-to-disk surface 310 side of upper surface 331 of the overcoat layer. That is to say, the etching pattern 40 does not reach the head end surface on the side of the opposed-to-disk surface 310. Further, the etching pattern 40 is not exposed from the closure 34 on the side of the opposed-to-disk surface 310. This can avoid an overexposure of the adhesive material from the head end surface on the side of the opposed-to-disk surface 310 in excess of the exposed end surface of the adhesive layer.

The etching pattern is not limited to the repeated lattice pattern, but as reference numeral 40' shown in FIG. 4b, it may be a pattern in which islands with S-curve shape are aligned in the etched area. In each case of the etching pattern 40 and 40', the adhesive, which is filled and pressed during the adhesion process of the closure, can make an escape toward the opening portion 400 or 400' through the continuing etched area. Therefore, it is in the scope of the present invention to provide an etching pattern that has a continuing etched area reaching an opening portion.

Figure 5:
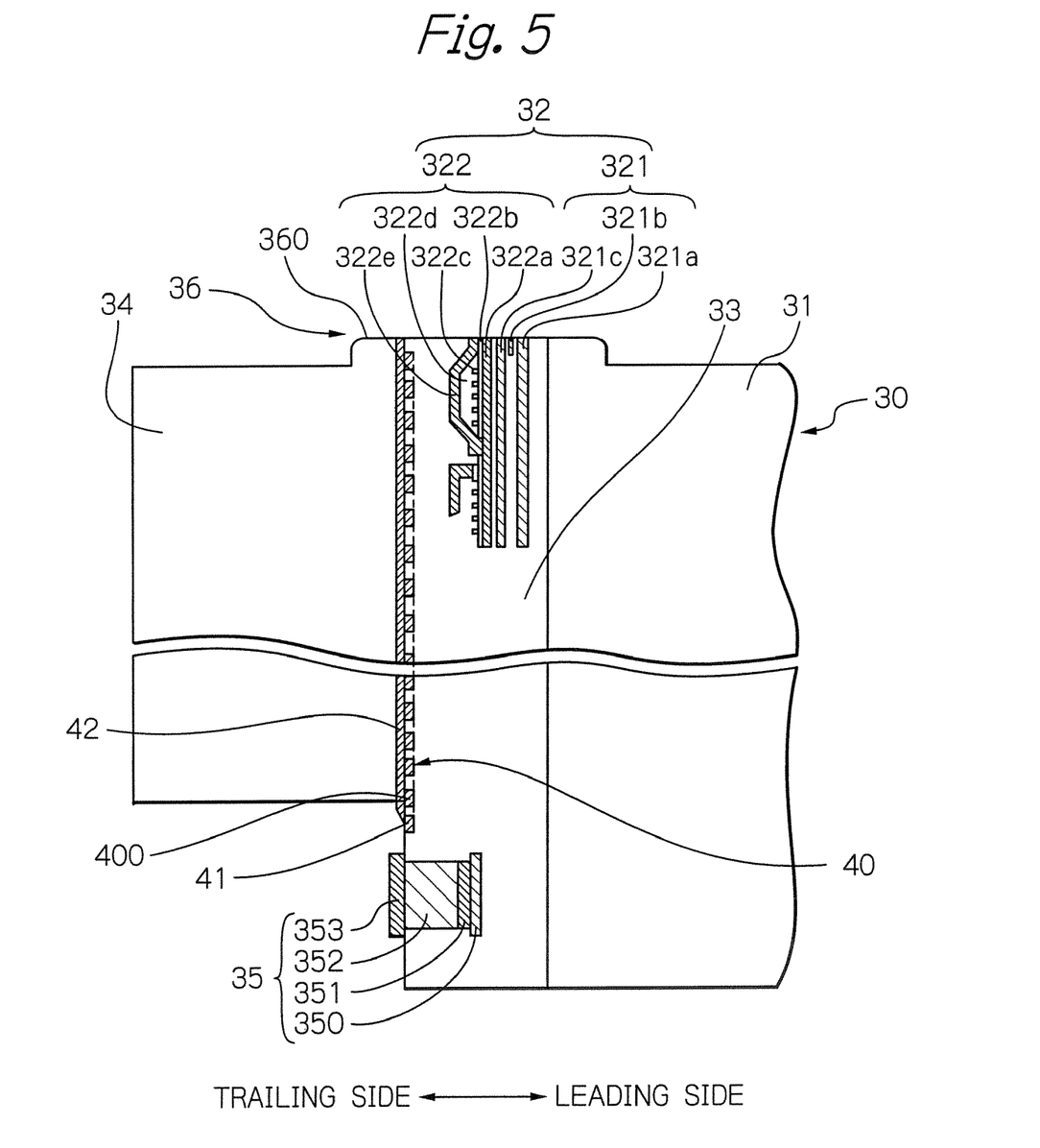
FIG. 5 shows a cross-sectional view taken along line A-A in FIG. 3a illustrating a main part of the magnetic head element and the signal electrodes.

FIG. 5 shows a cross-sectional view taken along line A-A in FIG. 3a illustrating a main part of the magnetic head element 32 and the signal electrodes 35. In the figure, the magnetic head element 32 and the signal electrode 35 appear on the same cross-section for convenience of explanation. However, for example, the signal electrodes 35 may be provided in the positions where they do not appear in this cross-section.

As shown in the figure, the magnetic head element 32 comprises an MR effect element 321 for reading data signals and an electromagnetic coil element 322 for writing data signals. Two and two of the four signal electrodes 35 (only one appears in the figure) are connected to the MR effect element 321 and the electromagnetic coil element 322 respectively.

The one ends of the MR effect element 321 and the electromagnetic coil element 322 reaches the contact surface 360 of the element contact pad 36. In the thin-film magnetic head 30, the contact surface 360 has contact with the rotated magnetic disk during read and write operations, then the MR effect element 321 reads by receiving signal fields from the disk and the electromagnetic coil element 321 writes by applying signal fields to the disk.

The MR effect element 321 includes an MR multilayer 321b, and a lower shield layer 321a and an upper shield layer 321c disposed in positions sandwiching the MR multilayer 321b. The lower shield layer 321a and the upper shield layer 321c prevent the MR multilayer 321b from receiving external magnetic fields as disturbing noises. The lower shield layer 321a and the upper shield layer 321c are formed of, for example, NiFe, CoFeNi, CoFe, FeN, FeZrN or the multilayer of these materials with thickness of approximately 0.5 µm to 3 µm by means of, for example, frame plating technique or sputtering technique, respectively.

The MR multilayer 321b is preferably a TMR multilayer that is a magnetic-field-sensitive part utilizing a TMR effect. The TMR multilayer has a main multilayered structure in which a free layer and a pinned layer sandwich a tunnel barrier layer. In this structure, when the direction of the magnetization in the free layer varies according to signal fields, the tunnel current increase or decease due to the fluctuation in the state density of up-spin and down-spin electrons, therefore, the electrical resistance of the TMR multilayer is changed. The measurement of the resistance change allows weak signal fields to be sensitively read.

Generally, a temperature coefficient of the resistance-change ratio generated from the change in the tunnel current has a minus value, and the absolute value is at least one order of magnitude smaller than that of the other MR effect. Therefore, in the contact recording case, using the TMR multilayer can suppress the generation of abnormal signals (thermal asperity) due to the frictional heat between the MR effect element and the surface of the disk. However, when the generated thermal asperity is tolerable, the MR multilayer 321b may be a CIP (current in plane)-GMR (giant magnetoresistive) multilayer or a CPP (current perpendicular to plane)-GMR multilayer, each of which can also senses signal fields with very high sensitivity.

The electromagnetic coil element 322 comprises: a lower magnetic pole layer 322a formed of, for example, NiFe, CoFeNi, CoFe, FeN, FeZrN or the multilayer of these materials with thickness of approximately 0.5 µm to 3 µm by means of, for example, frame plating technique or sputtering technique; a write gap layer 322b formed of, for example, $Al_2O_3$, $SiO_2$, AlN or DLC (diamond-like carbon) with thickness of approximately 0.01 µm to 0.05 µm by means of sputtering technique or chemical vapor deposition (CVD) method; a coil layer 322c formed of, for example, Cu with thickness of approximately 1 µm to 5 µm by means of, for example, frame plating technique or sputtering technique; a coil insulating layer 322d formed of, for example, a heat-cured resist so as to cover the coil layer 322c with thickness of approximately 0.5 µm to 7 µm; and an upper magnetic pole layer 322e formed of, for example, NiFe, CoFeNi, CoFe, FeN, FeZrN or the multilayer of these materials with thickness of approximately 0.5 µm to 3 µm by means of, for example, frame plating technique or sputtering technique.

The upper and lower magnetic pole layers 322e and 322a constitute a magnetic path for the magnetic flux generated by write currents flowing through the coil layer 322c. One end portions of the layers 322e and 322a pinch one end portion of the write gap layer 322b. The leakage field near the one end portion of the write gap layer 322b is used for writing to the magnetic disk.

In FIG. 5, the coil layer 322c is a monolayered coil, however, may be an at-least-two-layered coil or a helical coil. Further, instead of the upper shield layer 321c and the lower magnetic pole layer 322a, only one magnetic layer may be formed which serves as both layers.

The signal electrode 35 is formed on a lead electrode 350, and is connected electrically to the lead electrode 350. The lead electrode 350 is connected electrically to the MR multilayer 321b of the MR effect element 321 or the coil layer 322c of the electromagnetic coil element 322, and is drawn from the element. A base electrode film 351 with conductivity is formed on the lead electrode 350, and a bump 352 extending upward are formed by electrolytic plating using the base electrode film 351 as electrode. The base electrode film 351 and the bump 352 are made of a conductive material such as Cu. The thickness of the base electrode film 351 is, for example, approximately 10 nm to 200 nm and the thickness of the bump 352 is, for example, approximately 5 µm to 30 µm.

The top end of the bump 352 is exposed from the overcoat layer 33, and a pad 353 is provided on this top end. These above-described parts constitute the signal electrode 35, and currents are supplied to the magnetic head element 32 through the four signal electrodes 35.

FIGS. 6 and 7 show schematic views explaining some steps of an embodiment of the manufacturing method of the thin-film head according to the present invention.

First, though not shown in the figures, the magnetic head element 32 is formed on a wafer substrate made of, for example, AlTiC ($Al_2O_3$—TiC) and so on by means of the well-known manufacturing technique. Then, the overcoat layer 33 is formed of, for example, $Al_2O_3$, etc. with thickness of approximately 50 μm to 100 μm so as to cover the magnetic head element 32, and its upper surface is planarized by the well-known polishing method. After that, the pads 353 are formed over the bumps 352 (shown in FIG. 5) that have already formed by the well-known method and are exposed by the above-mentioned polishing method.

Figure 6A:
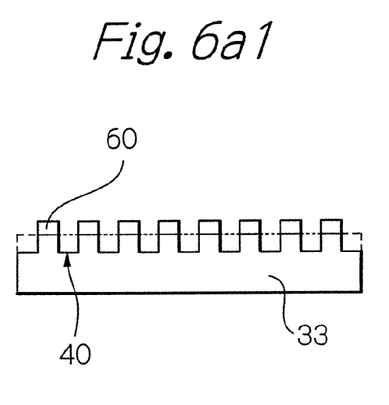
FIG. 6 shows schematic views explaining some steps of an embodiment of the manufacturing method of the thin-film head according to the present invention.
Figure 6A:
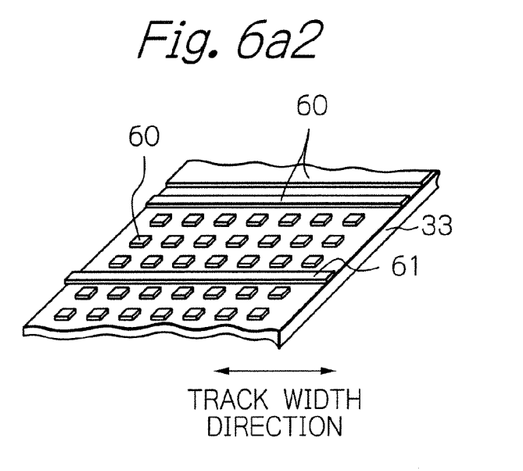
Figure 6B:
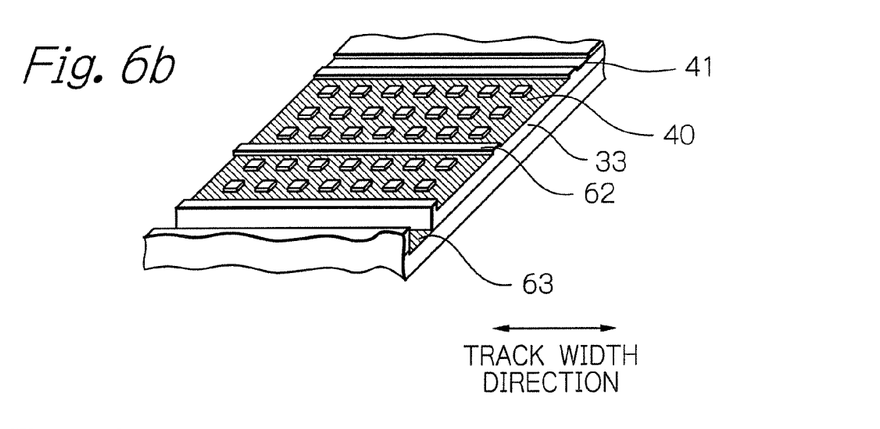

Next, as shown in FIGS. 6a1 and 6a2, photoresist patterns 60 and 61 are formed on the planarized upper surface of the overcoat layer 33, then as shown in FIG. 6b, the etching patterns 40 and the outflow-preventing grooves 41 are formed by means of dry-etching method such as a milling or chemical etching method using the photoresist patterns 60 and 61 as masks. In the process, MR height process zones 62 that are non-etched portions under the photoresist patterns 61 are simultaneously formed. The width of the MR height process zones 62 is, for example, approximately 10 μm.

Next, as shown in FIG. 6b, chipping-preventing grooves 63 are formed by using a dicing saw, which include lines being to become an edge on the opposed-to-disk surface side of the upper surface of the overcoat layer 33. The chipping-preventing grooves 63 play a role in preventing the adhesive from outflowing to adjacent patterns during the adhesion process of the closure, as well as preventing chipping during the cutting process of the wafer. The chipping-preventing groove 63 has a size of, for example, approximately 100 μm in width and approximately 100 μm in depth.

Figure 6C:
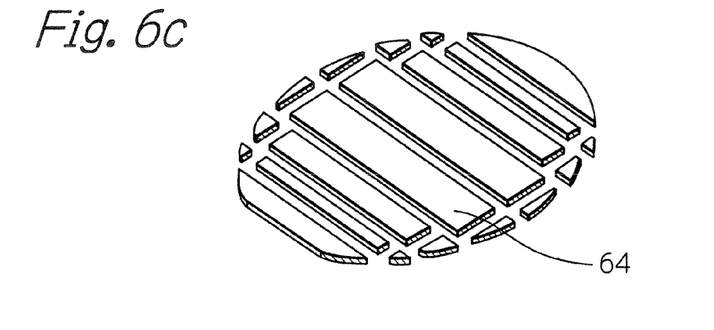

Then, as shown in FIG. 6c, the processed wafer substrate is cut into a plurality of substrate pieces. The substrate piece has a chip row or a plurality of chip rows, for example, 50 rows, in which a chip corresponds to a thin-film magnetic head including at least one magnetic head element. The number of chips in one row is, for example, 40 to 50.

Figure 7A:
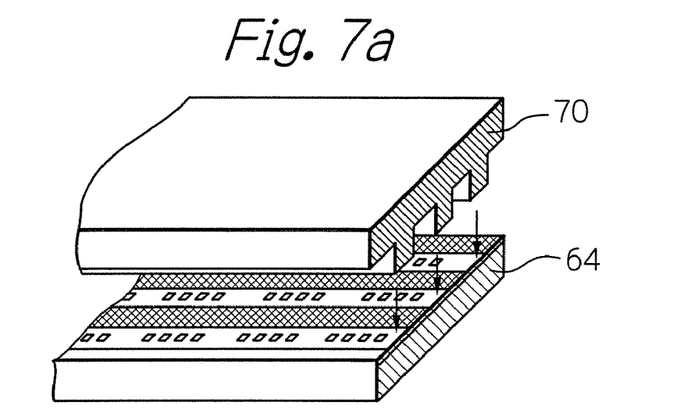
FIG. 7 shows schematic views explaining some steps of an embodiment of the manufacturing method of the thin-film head according to the present invention.
Figures 7B, 7B:
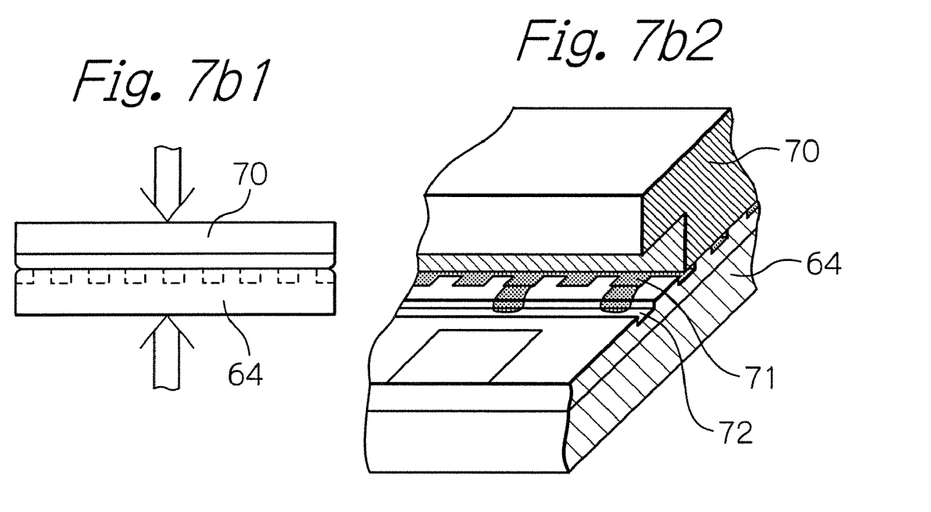

Next, as shown in FIG. 7a, a closure block 70, formed of, for example, AlTiC ($Al_2O_3$—TiC) and so on, is bonded on the upper surface of the overcoat layer formed on the substrate piece 64. The closure block 70 has adhesive surface(s) that are top surface(s) of a long convex part or a plurality of long convex parts, and the adhesive such as an epoxy resin is applied on the adhesive surfaces. After the applying, the closure block 70 is bonded on the upper surface area, in which the etching pattern has formed, of the overcoat layer formed on the substrate piece 64, under a predetermined bonding condition. In the bonding process, as shown in FIG. 7b2, the opening portion 71 is formed close to the edge of the adhesive surface on the opposite side to the opposed-to-disk surface, as the result that the etching pattern runs off the edge and is exposed.

As a pretreatment process of the bonding process, the upper surface of the overcoat layer formed on the substrate piece 64 and the adhesive surfaces of the closure block 70 preferably undergo a plasma cleaning. Further, the adhesive can be applied on the upper surface of the substrate piece 64, instead of or in company with the adhesive surfaces of the closure block 70. However, it should be noted that a problem of pollution of the pads and so on by the adhesive may happen especially when using a spin coat method.

In the bonding process, as shown in FIGS. 7b1 and 7b2, a predetermined pressure is applied to the bonded object of the substrate piece 64 and the closure block 70 in the direction normal to the adhesive surface in order to improve the adhesive strength. During applying the pressure, the applied adhesives are likely to outflow from the opening portion 71 and/or from the adhesive layer close to the edge of the adhesive surface on the side of the opposed-to-disk surface. However, in respective outflow cases, the outflowing adhesives are pooled in the outflow-preventing grooves 72 and in the chipping-preventing grooves 63 (in FIG. 6b) respectively to stop outflowing beyond the respective grooves. As a result, the pollution by the adhesive of the signal electrodes formed in the neighborhood can be prevented.

By taking the just described measures against the outflow of the adhesives, a sufficient amount of pressure can be applied to improve the adhesive strength. This enables the thickness of the adhesive layer to be controlled to a desired small value of 0.1 μm or less and enables the variation in the thickness among manufactured heads to be suppressed. As a result, the problem of fine dusts to be caught in the end portion on the opposed-to-disk surface side of the adhesive layer can be avoided, which improves reliability in the adhesive strength and manufacturing yields.

Figure 7C:
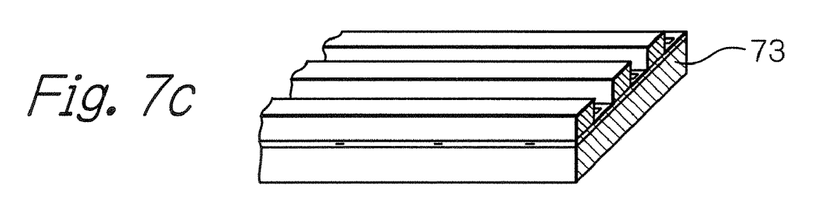

Then, as shown in FIG. 7c, a closure-bonded substrate piece 73 is formed by grinding the bonded object of the substrate piece 64 and the closure block 70 from the side of the closure block 70.

Figure 7D:
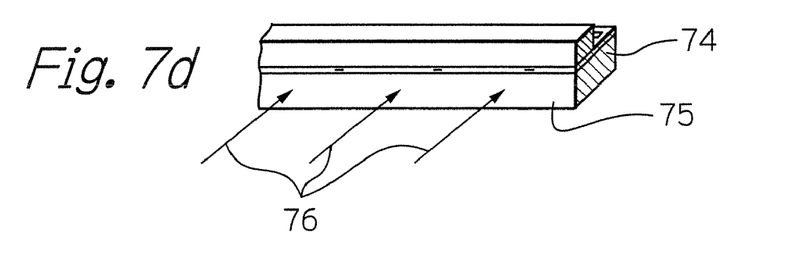

Next, as shown in FIG. 7d, the closure-bonded substrate piece 73 is cut into a plurality of row bars 74 in each of which the chips including the magnetic head element are aligned. After that, an MR height process is performed by polishing so as to obtain a desired MR height. The finished surface by the polishing, which becomes the opposed-to-disk surface and the head end surface on the side of the opposed-to-disk surface, is provided in the cross-sectional position of the MR height process zones 62 (shown in FIG. 6b). Therefore, the etching pattern never reaches the head end surface on the side of the opposed-to-disk surface. As a result, an overexposure of the adhesive in excess of the exposure of the end surface of the adhesive layer can be avoided.

Then, the element contact pad and the contact pads are formed by means of dry-etching method such as a milling or a reactive ion etching with ion 76, which finishes forming the structure on the sliding-side surface including the opposed-to-disk surface. After that, the row bar 74 is cut into individual sliders (thin-film magnetic heads), which completes manufacturing the thin-film magnetic head.

Figure 8A:
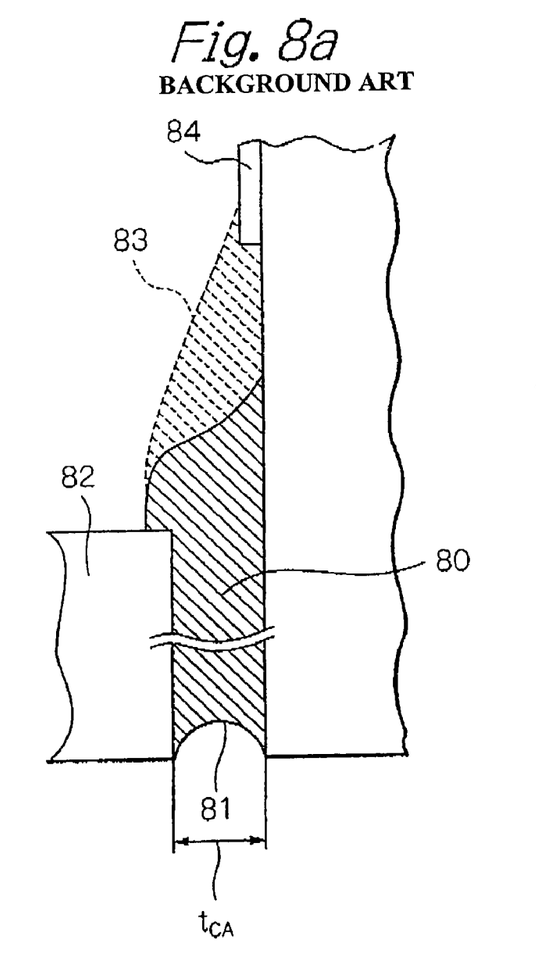
FIGS. 8a and 8b show cross-sectional views schematically illustrating the shape of the adhesive in the adhesive portion of the closure of the conventional closure-type thin-film magnetic head and the thin-film magnetic head according to the present invention.
Figure 8B:
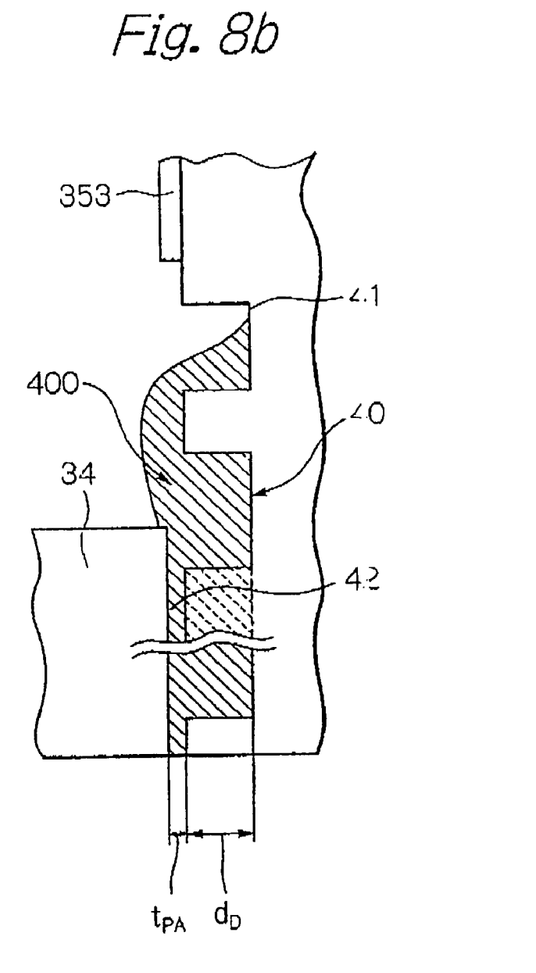

FIG. 8a shows a cross-sectional view schematically illustrating the shape of the adhesive in the adhesive portion of the closure of the conventional closure-type thin-film magnetic head, and FIG. 8b shows a cross-sectional view taken along line A-A in FIG. 3a schematically illustrating the shape of the adhesive in the adhesive portion of the closure of the thin-film magnetic head according to the present invention.

As shown in FIG. 8a, the conventional closure-type head has an adhesive layer 80 with the thickness $t_{CA}$ of at least approximately 0.4 to 0.5 μm, thus maintaining the required adhesive strength by securing such a large thickness. In the case of the adhesive layer 80 with such a large thickness, a recess 81 is formed in the end portion on the opposed-to-disk surface side of the adhesive layer 80 because abrasives break into the adhesive layer 80 and grind it during finish polishing. As a result, during read and write operations, the recess 81 has some possibility to catch and hold fine dusts, which may cause a negative effect about sliding operation between the head and the disk.

Furthermore, in the end portion opposite to the recess 81 of the adhesive layer 80, the adhesive runs off the closure 82, and pollutes the pad 84 if running off to a degree of broken line 83.

On the other hand, as shown in FIG. 8b, the thin-film magnetic head according to the present invention has the adhesive layer 42 with the thickness $t_{P4}$ of 0.1 μm or less, preferably 0.05 to 0.1 μm. In the case of the adhesive layer 42 with such a small thickness, almost no recess is formed in the end portion on the opposed-to-disk surface side of the adhesive layer 42 even during finish polishing. As a result, the negative effect about sliding operation between the head and the disk can be avoided during read and write operations. Actually, almost no recess is observed in the end portion of the adhesive layer where the recess is conventionally generated, in both of manufactured heads according to the present invention with the thicknesses of the adhesive layers of 0.05 μm and 0.1 μm.

In addition, the closure 34 is bonded on the etching pattern 40. Therefore, a substantially sufficient thickness is secured because the depth d of the etching pattern 40 reaches, for example, approximately 3 μm, though the thickness of the adhesive layer 42 is 0.1 μm or less. Further, the etching pattern 40 enlarges the contact area between the adhesive and the overcoat layer and increases anchor effect to maintain or improve the adhesive strength.

Furthermore, the adhesive runs off the closure 34 at the opening portion 400, however, the pollution of the pad 353 is avoided because the outflowing adhesive is pooled to be stopped in the outflow-preventing groove 41.

Figure 9A:
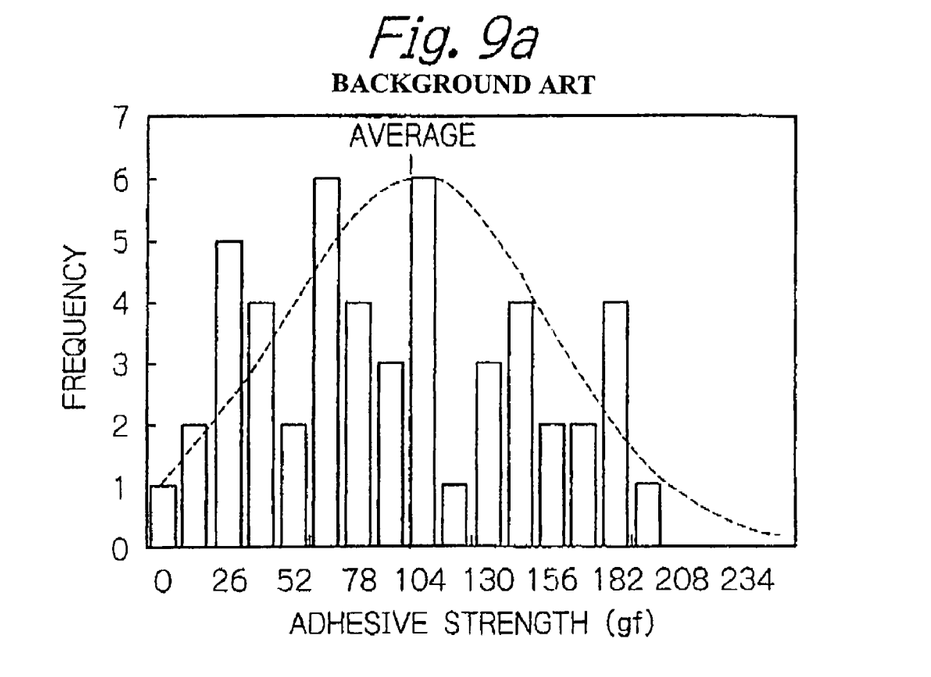
FIGS. 9a and 9b show histograms illustrating the distribution of the adhesive strength of the closure in the conventional closure-type thin-film magnetic head and the thin-film magnetic head according to the present invention.
Figure 9B:
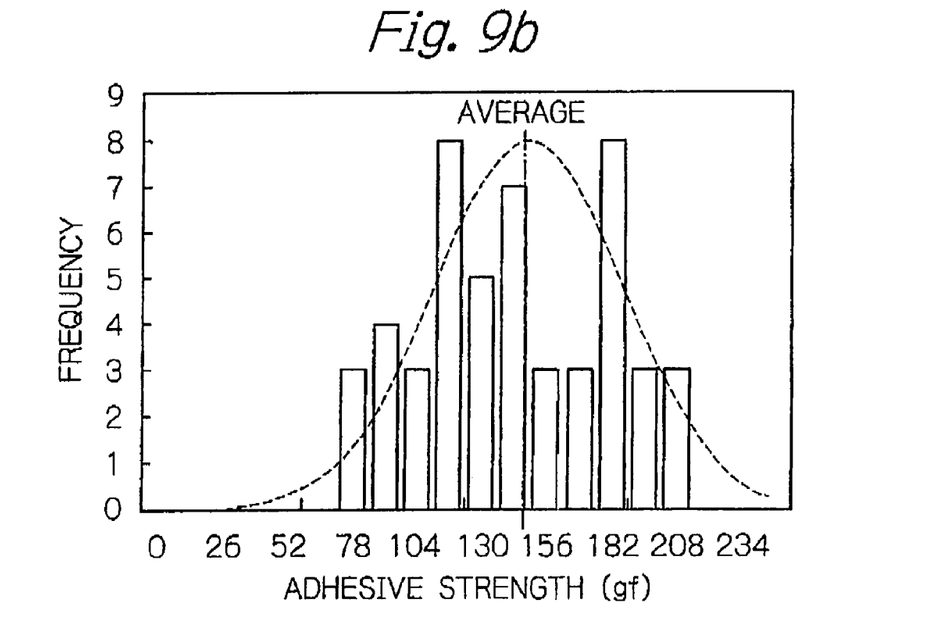

FIGS. 9a and 9b show histograms illustrating the distribution of the adhesive strength of the closure in the conventional closure-type thin-film magnetic heads and the thin-film magnetic heads according to the present invention.

In the histograms, an adhesive strength is defined as a threshold load value above which the closure is broken away when applying load to the closure in the direction normal to the opposed-to-disk surface. The areas of the adhesive surfaces of the closures in the conventional head and the head according to the present invention are equal to each other. And the thicknesses of the adhesive layers in the both heads are 0.4-0.5 μm and 0.1 μm respectively, and the number of the samples of the each head is 50.

As shown in FIG. 9a, in the conventional closure-type thin-film magnetic heads, the average value is 101 gf (gram-force) and the standard deviation is 54 gf when considering the distribution of the adhesive strength to approximate to a normal distribution. On the contrary, in the thin-film magnetic heads according to the present invention, the average value is 149 gf (gram-force) when considering the distribution of the adhesive strength to approximate to a normal distribution. That is to say, the adhesive strength in the present invention is enhanced on average by almost 50% compared to that of the conventional head. Further, the standard deviation in the present invention is 38 gf, which is reduced by approximately 30% compared to that of the conventional head. Therefore, it is understood that the thin-film magnetic head according to the present invention shows sufficiently improved adhesive strength of the closure and high reliability of the adhesive strength with small variations in the adhesive strength among manufactured heads though the thickness of the adhesive layer is much smaller than that of the conventional head. The improvement of the variations in the adhesive strength is considered to be caused by stabilizing the thickness of the adhesive layer due to the application of the sufficient amount of pressure during bonding process.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head, comprising:
   a substrate having an element-formed surface and an opposed-to-medium surface;
   at least one magnetic head element provided on/above said element-formed surface, for writing and/or reading data signals;
   an overcoat layer formed on said element-formed surface so as to cover said at least one magnetic head element;
   an etching pattern formed on a part of an upper surface of said overcoat layer, the whole or a part of said etching pattern being filled up by adhesive;
   a closure provided on said etching pattern of said overcoat layer;
   an opening portion formed close to an edge of an adhesive surface of said closure, said edge being on the opposite side to said opposed-to-medium surface, said opening portion being a portion of said etching pattern, and the etching pattern portion being exposed from said closure; and
   a groove configured to prevent adhesive from outflowing, and formed on the upper surface of said overcoat layer and in the back of said opening portion when viewed from said opposed-to-medium surface side, at least one pad of a signal electrode for said at least one magnetic head element being provided on the upper surface of said overcoat layer and in the back of said groove when viewed from said opening portion side,
   a thickness of an adhesive layer between a non-etched upper surface of said etching pattern and the adhesive surface of said closure being 0.1 micrometer or less to prevent a formation of a recess in an end portion on the opposed-to-medium-surface side of said adhesive layer, said recess causing a negative effect of a sliding operation between the head and the medium.

2. The thin-film magnetic head as claimed in claim 1, wherein said etching pattern includes a repeated lattice pattern with a continuing etched area.

3. The thin-film magnetic head as claimed in claim 1, wherein said etching pattern is provided in such a way that said etching pattern does not reach an edge on said opposed-to-medium surface side of the upper surface of said overcoat layer.

4. The thin-film magnetic head as claimed in claim 1, wherein at least one element contact pad is provided, having a contact surface including a part of said opposed-to-medium surface of said substrate, a part of an end surface of said overcoat layer and a part of an end surface of said closure, and one end of said at least one magnetic head element reaches said contact surface.

5. A head gimbal assembly: including a thin-film magnetic head, the thin-film magnetic head comprising:
   a substrate having an element-formed surface and an opposed-to-medium surface;
   at least one magnetic head element provided on/above said element-formed surface, for writing and/or reading data signals;

an overcoat layer formed on said element-formed surface so as to cover said at least one magnetic head element;

an etching pattern formed on a part of an upper surface of said overcoat layer, the whole or a part of said etching pattern being filled up by adhesive;

a closure provided on said etching pattern of said overcoat layer;

an opening portion formed close to an edge of an adhesive surface of said closure, said edge being on the opposite side to said opposed-to-medium surface, said opening portion being a portion of said etching pattern, and the etching pattern portion being exposed from said closure; and a groove configured to prevent adhesive from outflowing, and formed on the upper surface of said overcoat layer and in the back of said opening portion when viewed from said opposed-to-medium surface side, at least one pad of a signal electrode for said at least one magnetic head element being provided on the upper surface of said overcoat layer and in the back of said groove when viewed from said opening portion side, a thickness of an adhesive layer between a non-etched upper surface of said etching pattern and the adhesive surface of said closure being 0.1 micrometer or less to prevent a formation of a recess in an end portion on the opposed-to-medium-surface side of said adhesive layer, said recess causing a negative effect of a sliding operation between the head and the medium, said head gimbal assembly further including trace conductors for supplying currents to said at least one magnetic head element; and a support structure for supporting said thin-film magnetic head.

6. The head gimbal assembly as claimed in claim 5, wherein said etching pattern includes a repeated lattice pattern with a continuing etched area.

7. The head gimbal assembly as claimed in claim 5, wherein said etching pattern is provided in such a way that said etching pattern does not reach an edge on said opposed-to-medium surface side of the upper surface of said overcoat layer.

8. The head gimbal assembly as claimed in claim 5, wherein at least one element contact pad is provided, having a contact surface including a part of said opposed-to-medium surface of said substrate, a part of an end surface of said overcoat layer and a part of an end surface of said closure, and one end of said at least one magnetic head element reaches said contact surface.

9. A magnetic recording apparatus including: at least one head gimbal assembly: including a thin-film magnetic head, the thin-film magnetic head comprising:

a substrate having an element-formed surface and an opposed-to-medium surface;

at least one magnetic head element provided on/above said element-formed surface, for writing and/or reading data signals;

an overcoat layer formed on said element-formed surface so as to cover said at least one magnetic head element;

an etching pattern formed on a part of an upper surface of said overcoat layer, the whole or a part of said etching pattern being filled up by adhesive;

a closure provided on said etching pattern of said overcoat layer;

an opening portion formed close to an edge of an adhesive surface of said closure, said edge being on the opposite side to said opposed-to-medium surface, said opening portion being a portion of said etching pattern, and the etching pattern portion being exposed from said closure; and a groove configured to prevent adhesive from outflowing, and formed on the upper surface of said overcoat layer and in the back of said opening portion when viewed from said opposed-to-medium surface side, at least one pad of a signal electrode for said at least one magnetic head element being provided on the upper surface of said overcoat layer and in the back of said groove when viewed from said opening portion side, a thickness of an adhesive layer between a non-etched upper surface of said etching pattern and the adhesive surface of said closure being 0.1 micrometer or less to prevent a formation of a recess in an end portion on the opposed-to-medium-surface side of said adhesive layer, said recess causing a negative effect of a sliding operation between the head and the medium, said head gimbal assembly further including trace conductors for supplying currents to said at least one magnetic head element; and a support structure for supporting said thin-film magnetic head, and said magnetic recording apparatus further including at least one magnetic recording medium; and a recording and/or reproducing circuit for controlling write and/or read operations of said at least one thin-film magnetic head in relation with said at least one magnetic recording medium.

10. The magnetic recording apparatus as claimed in claim 9, wherein said etching pattern includes a repeated lattice pattern with a continuing etched area.

11. The magnetic recording apparatus as claimed in claim 9, wherein said etching pattern is provided in such a way that said etching pattern does not reach an edge on said opposed-to-medium surface side of the upper surface of said overcoat layer.

12. The magnetic recording apparatus as claimed in claim 9, wherein at least one element contact pad is provided, having a contact surface including a part of said opposed-to-medium surface of said substrate, a part of an end surface of said overcoat layer and a part of an end surface of said closure, and one end of said at least one magnetic head element reaches said contact surface.

\* \* \* \* \*